US008433838B2

(12) United States Patent
Crockett et al.

(10) Patent No.: US 8,433,838 B2
(45) Date of Patent: Apr. 30, 2013

(54) REMOTE MULTIPLEXING DEVICES ON A SERIAL PERIPHERAL INTERFACE BUS

(75) Inventors: Timothy W. Crockett, Raleigh, NC (US); Jay H. Kim, Raleigh, NC (US); Charles R. Kirk, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 203 days.

(21) Appl. No.: 12/884,398

(22) Filed: Sep. 17, 2010

(65) Prior Publication Data

US 2012/0072628 A1 Mar. 22, 2012

(51) Int. Cl.
*G06F 13/00* (2006.01)

(52) U.S. Cl.
USPC .......................................... 710/110

(58) Field of Classification Search .......... 710/104–119, 710/306, 316–317
See application file for complete search history.

(56) References Cited

U.S. PATENT DOCUMENTS

| 5,592,633 | A | 1/1997 | Casis et al. |
| 5,878,234 | A | 3/1999 | Dutkiewicz et al. |
| 6,898,689 | B2 | 5/2005 | Storvik, II et al. |
| 7,689,740 | B2 | 3/2010 | Chou |
| 7,765,269 | B2 * | 7/2010 | Kanekawa et al. ........... 709/208 |
| 7,830,906 | B2 * | 11/2010 | Satoh et al. ................... 370/423 |
| 2003/0128702 | A1 * | 7/2003 | Satoh et al. ................... 370/390 |
| 2004/0123011 | A1 * | 6/2004 | Murayama et al. ........... 710/305 |
| 2005/0235084 | A1 * | 10/2005 | Nariai ............................ 710/110 |
| 2006/0090024 | A1 * | 4/2006 | Tanabe .......................... 710/110 |
| 2006/0277346 | A1 | 12/2006 | Doak et al. |
| 2007/0143512 | A1 * | 6/2007 | Kuo .............................. 710/110 |
| 2008/0005434 | A1 * | 1/2008 | Lee et al. ...................... 710/110 |
| 2008/0133779 | A1 * | 6/2008 | Ho et al. ........................... 710/5 |
| 2008/0235411 | A1 * | 9/2008 | Zhang et al. ..................... 710/28 |
| 2008/0253392 | A1 * | 10/2008 | Diab ............................ 370/466 |
| 2009/0031048 | A1 | 1/2009 | Richards et al. |
| 2009/0193165 | A1 * | 7/2009 | Hsieh et al. ................... 710/110 |
| 2010/0138576 | A1 * | 6/2010 | Goerlich et al. .............. 710/110 |
| 2010/0180067 | A1 | 7/2010 | Garcia et al. |
| 2011/0078350 | A1 * | 3/2011 | Carls ............................ 710/110 |

FOREIGN PATENT DOCUMENTS

WO WO96/21974 7/1996

OTHER PUBLICATIONS

Mark Austin Lee, "Enhancing SPI Protocol to Enable Asynchronous Master or Slave Transfer Request", Jul. 17, 2002, 4 pages.
Contributing Author, "Serial-Control Multiplexer Expands SPI Chip Selects", http://electronicdesign.com/article/boards-modules-systems/serial-control-multiplexer-expands-spi-chip-select.aspx, Mar. 23, 1998, 1 page.

* cited by examiner

*Primary Examiner* — Raymond Phan
(74) *Attorney, Agent, or Firm* — Thomas E. Tyson; Jeffrey L. Streets

(57) ABSTRACT

A serial peripheral interface (SPI) bus and method of communicating over an SPI bus to multiple slave devices without requiring the master device to have an independent slave select pin for each slave device. The SPI bus comprises an SPI master device coupled to an SPI multiplex slave device and a plurality of SPI non-multiplex slave devices. The SPI multiplex slave device includes an independent slave select (SS) output pin coupled to each one of the SPI non-multiplex slave devices for sending an activation signal to a selected SPI slave device in response to receiving a command from the master device containing identification of the selected SPI slave device.

11 Claims, 5 Drawing Sheets

REMOTE MULTIPLEXING DEVICES ON A SERIAL PERIPHERAL INTERFACE BUS

BACKGROUND

1. Field of the Invention

The present invention relates to the design and operation of a serial peripheral interface (SPI) bus having a single master device and multiple slave devices.

2. Background of the Related Art

A serial peripheral interface (SPI) bus is a synchronous serial data link standard that operates in full duplex mode. SPI is sometimes referred to as a "four wire" serial bus, including (1) a clock (CLK) output from a master device to an input on a slave device, (2) a master output, slave input (MOSI), (3) a master input, slave output (MISO), and (4) a slave select (SS) output from the master device. FIG. 1 is a diagram of an SPI bus between a single master device and a single slave device. Typically, both the master and slave devices have a shift register connected in a ring by the MOSI and MISO lines. Data is shifted until the contents of the registers have been exchanged. Each device may then take the data from its register for processing, such as storage into memory. This process may repeat as necessary to transmit any desired data or command.

In some applications, such as a serial general purpose input/output (SGPIO) bus, two or more slave devices are connected in a daisy chain configuration. FIG. 2 is a diagram of an SPI bus between a single master device and three slave devices in a daisy chain. Accordingly, the MOSI pin of the master device is coupled to the MOSI pin of the first slave device, MISO pin of the first slave is coupled to the MOSI pin of the second slave, the MISO pin of the second slave is coupled to the MOSI pin of the third slave, and the MISO pin of the third slave is then coupled to the MISO pin of the master device. In operation, data shifts from one device to the next in the daisy chain such that the master device can provide data or commands to any of the three slave devices, and any/all of the three slave devices can provide data to the master device.

Independent slaves may be implemented if the master device has an independent slave select line for each slave device with which it will communicate. In FIG. 3, the master device has three independent slave select output pins, SS1, SS2 and SS3, that are coupled to the slave select input pins of first, second and third slaves, respectively. Each of the independent slave devices is coupled in parallel with the CLK, MOSI, and MISO lines of the master device, but only the slave device receiving a slave select signal will drive its MISO pin. Other unselected slave devices will simply ignore or disregard the CLK and MOSI signals.

BRIEF SUMMARY

One embodiment of the present invention provides a serial peripheral interface (SPI) bus. The SPI bus comprises an SPI master device having a master output, slave input (MOSI) pin; a master input, slave output (MISO) pin; a clock (CLK) output pin; and a slave select (SS) output pin. Each of the master device pins are coupled in parallel to an SPI multiplex slave device and a plurality of SPI non-multiplex slave devices. The SPI multiplex slave device includes an independent SS output pin coupled to each one of the SPI non-multiplex slave devices for sending an activation signal to a selected slave device in response to receiving a command from the master device containing the address of the selected slave. Accordingly, a plurality of non-multiplex slave device may be utilized on an SPI bus without requiring the master device to have an independent SS pin for each slave device.

Another embodiment of the invention provides a serial peripheral interface (SPI) bus, comprising an SPI master device including: (a) a master output, slave input (MOSI) pin; (b) a master input, slave output (MISO) pin; (c) a clock (CLK) output pin; and (d) a slave select (SS) output pin. The SPI bus further comprises an SPI multiplex slave device and a plurality of SPI non-multiplex slave devices, each of the multiplex and non-multiplex slave devices including: (a) a master output, slave input (MOSI) pin coupled to the MOSI pin of the master device; (b) a master input, slave output (MISO) pin coupled to the MISO pin of the master device; (c) a clock (CLK) input pin coupled to the CLK output pin of the master device; and (d) a slave select (SS) input pin. The slave select output pin of the master device is coupled to the slave select input pin of the multiplex slave device, and the multiplex slave device includes a plurality of slave select output pins. Each slave select output pin of the multiplex slave device is coupled to the slave select input pin associated with one of the non-multiplex slave devices.

Yet another embodiment of the invention provides a method of communicating between a master device and multiple slave devices on an SPI bus. The method comprises initializing the SPI bus to route data output from the master device to an addressable multiplex slave device; the master device sending a slave identification code to the multiplex slave device; the multiplex slave device providing an SS signal only to a slave device associated with the slave identification code received from the master device; the selected slave device activating an output pin to the master in response to receiving the SS signal from the multiplex slave; and sending data between the master device and the selected slave device.

DETAILED DESCRIPTION

Figure 1:
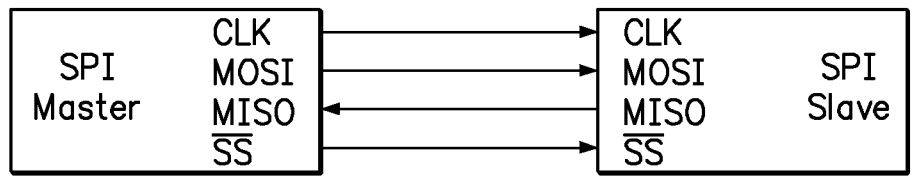
FIG. 1 is a diagram of an SPI bus between a single master device and a single slave device.
Figure 2:
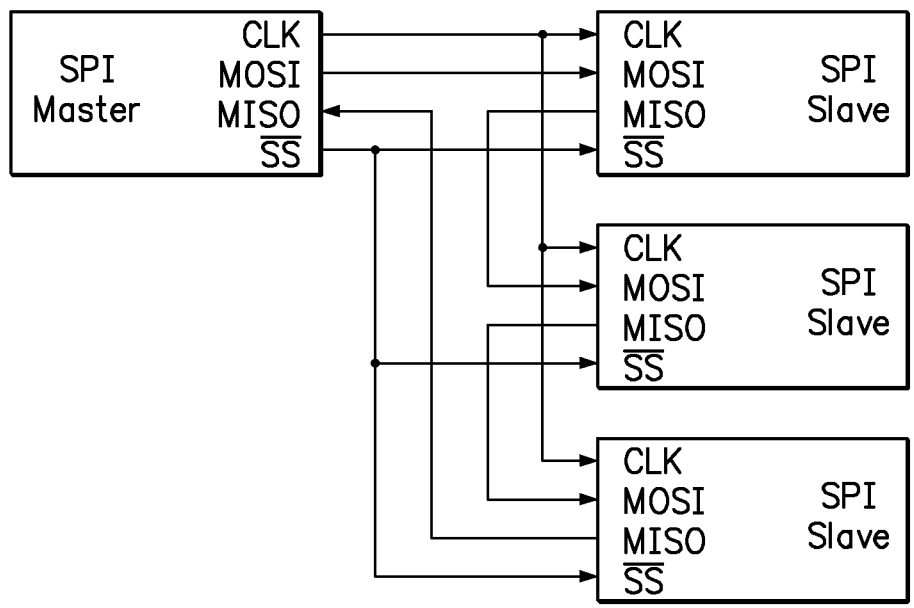
FIG. 2 is a diagram of an SPI bus between a single master device and three slave devices in a daisy chain.

One embodiment of the present invention provides a serial peripheral interface (SPI) bus. The SPI bus comprises an SPI master device having a master output, slave input (MOSI) pin; a master input, slave output (MISO) pin; a clock (CLK) output pin; and a slave select (SS) output pin. Each of the master device pins are coupled in parallel to an SPI multiplex slave device and a plurality of SPI non-multiplex slave devices. The SPI multiplex slave device includes an independent slave select (SS) output pin coupled to each one of the SPI non-multiplex slave devices for sending an activation signal to a selected slave device in response to receiving a command from the master device containing the address of the selected slave. Accordingly, a plurality of non-multiplex slave devices may be utilized on an SPI bus without requiring the master device to have an independent SS pin for each slave device.

In another embodiment, one of the independent SS output pins of the SPI multiplex slave and the SS output pin of the SPI master device are input to an OR circuit having an output coupled to an SS input pin of one the plurality of SPI non-multiplex slave devices. Therefore, an SPI non-multiplex slave device will only have duplex communication with the master device if the master device is driving its SS pin and the multiples slave device is driving the independent SS pin to the SPI non-multiplex slave device.

In yet another embodiment, each non-multiplex slave device has a unique identification code stored at a fixed address common to each of the non-multiplex slave devices. Accordingly, when the master device reads from the fixed address, it will receive the identification code of the slave device that is currently selected, whether that slave device is the multiplex slave or one of the plurality of non-multiplex slaves. In a further option, each of the multiplex and non-multiplex slave devices stores the identification codes in "read-only" memory. Preferably, the non-multiplex slave devices ignore any attempt to write over the identification code at the fixed address, whereas the multiplex slave device monitors the SPI bus traffic and recognizes a write to the fixed address as a command to change the selected slave device. For this purpose, the SPI multiplex slave will typically include an SPI controller that can detect the write command, and determine which of its SS pins to drive.

Another embodiment of the invention provides a serial peripheral interface (SPI) bus, comprising an SPI master device including: (a) a master output, slave input (MOSI) pin; (b) a master input, slave output (MISO) pin; (c) a clock (CLK) output pin; and (d) a slave select (SS) output pin. The SPI bus further comprises an SPI multiplex slave device and a plurality of SPI non-multiplex slave devices, each of the multiplex and non-multiplex slave devices including: (a) a MOSI pin coupled to the MOSI pin of the master device; (b) a MISO pin coupled to the MISO pin of the master device; (c) a CLK input pin coupled to the CLK output pin of the master device; and (d) an SS input pin. The slave select output pin of the master device is coupled to the slave select input pin of the multiplex slave device, and the multiplex slave device includes a plurality of slave select output pins. Each slave select output pin of the multiplex slave device is coupled to the slave select input pin associated with one of the non-multiplex slave devices.

Optionally, the SPI bus may further comprise a plurality of OR circuits, wherein each slave select output pin of the multiplex slave device is coupled to the slave select input pin associated with one of the non-multiplex slave devices through one of the OR circuits, wherein each OR circuit has a first input coupled to the slave select output pin of the master device, a second input coupled to one of the slave select output pins of the multiplex slave device, and an output coupled to the slave select input pin of the associated one of the plurality of non-multiplex slaves. Because the SS input to the each of the SS pins are typically "active low", the OR circuit will produce an "active low" output only when both of the inputs are low.

Yet another embodiment of the invention provides a method of communicating between a master device and multiple slave devices on an SPI bus. The method comprises initializing the SPI bus to route data output from the master device to an addressable multiplex slave device; the master device sending a slave identification (ID) code to the multiplex slave device; the multiplex slave device providing an SS signal only to a slave device associated with the slave ID code received from the master device; the selected slave device activating an output pin to the master in response to receiving the SS signal from the multiplex slave; and sending data between the master device and the selected slave device.

In one embodiment of the method, the master device sends the slave ID code to the multiplex slave device by writing the slave ID code to a fixed memory address in the multiplex slave device. Each of the multiplex and non-multiplex slave devices will preferably have their ID codes stored in "read-only" memory at the same fixed memory address. Accordingly, each of the non-multiplex slave devices will ignore the write command, while an SPI controller in the multiplex slave device monitors for a write command to the fixed memory address and interprets the command as an instruction to enable communication with the slave ID code.

In a further embodiment of the method, the multiplex slave device monitors the MOSI pin for a write command form the master device directed to the fixed memory address to identify a subsequently selected slave ID code. Then, the multiplex slave device provides an SS signal only to the subsequently selected slave device in response to receiving the subsequently selected slave identification code from the master device. The subsequently selected slave device activates an MISO output pin to the master in response to receiving the SS signal from the multiplex slave. Data may then be sent between the master device and the subsequently selected slave device. The master device may subsequently select a slave device at any time in order to have duplex communication with any of the slave devices as needed.

In a still further embodiment of the method, the multiplex slave device configures its MISO pin as an input in response to the master device sending a slave ID code that is not the ID code of the multiplex slave. In this manner, a transceiver of the multiplex slave device can remain active to allow monitoring of the MOSI line, but the transceiver will not drive any data on the MISO line at the same time as the selected slave.

In yet another embodiment, an SPI bus comprises an SPI master device having first and second SS pins for selecting either a first or a second addressable SPI multiplex slave device. After the master device drives an SS line, the master device may select a slave device that is associated with the multiplex slave device by providing the multiplex slave with the ID code of the selected slave device.

Specifically, the SPI bus comprises an SPI master device including a MOSI pin, a MISO pin, and a CLK output pin coupled to an SPI multiplex slave device, a first plurality of SPI non-multiplex slave devices associated with the first SPI multiplex slave device, a second SPI multiplex slave device, and a second plurality of SPI non-multiplex slave devices associated with the second SPI multiplex slave device. The SPI master device further includes a first SS output pin coupled to an SS input pin of the first SPI multiplex slave device and a second SS output pin coupled to an SS input pin of the second SPI multiplex slave device. The first SPI multiplex slave device includes an independent SS output pin coupled to each one of the first plurality SPI non-multiplex slave devices for sending an activation signal to a selected slave device in response to receiving a signal on the first SS output pin of the master device and a command from the master device containing the ID code of the selected slave. Similarly, the second SPI multiplex slave device includes an independent SS output pin coupled to each one of the second plurality SPI non-multiplex slave devices for sending an activation signal to a selected slave device in response to receiving a signal on the second SS output pin of the master device and a command from the master device containing the ID code of the selected slave. Preferably, the master device or a driver to the master device associates each non-multiplex slave device with either the first or the second multiplex slave device so that the master device can drive the appropriate SS output pin and send the ID code of the selected slave device to the appropriate multiplex slave device.

Figure 3:
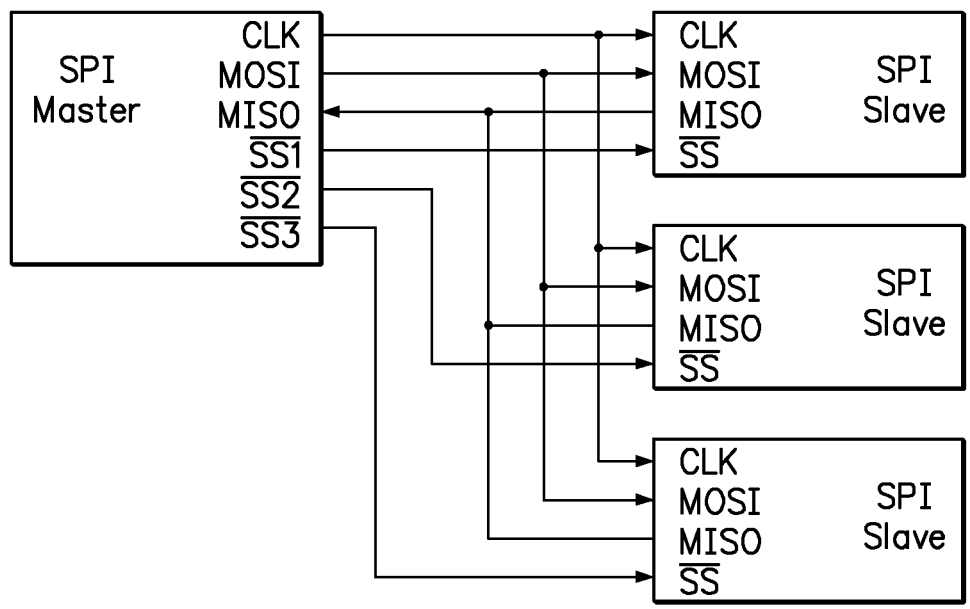
FIG. 3 is a diagram of an SPI bus between a single master device and three independently selectable slave devices.

An advantage of the using an addressable multiplex slave device, in accordance with one or more embodiment of the present invention, is that the master device does not require an independent SS pin for each slave device. For example, a system may have been designed with the master device on a first daughter card and the slaves on a second daughter card with a wiring or connecting system between them. However, in a prior art SPI bus, if one or more additional slave devices are desired, then both the first and second daughter cards must be redesigned and replaced with daughter cards that support the additional SS lines (one for each slave device—See FIG. 3). Embodiments of the present invention provide a way to extend an SPI bus system without the need to change the interconnect system or the master circuit.

Figure 4:
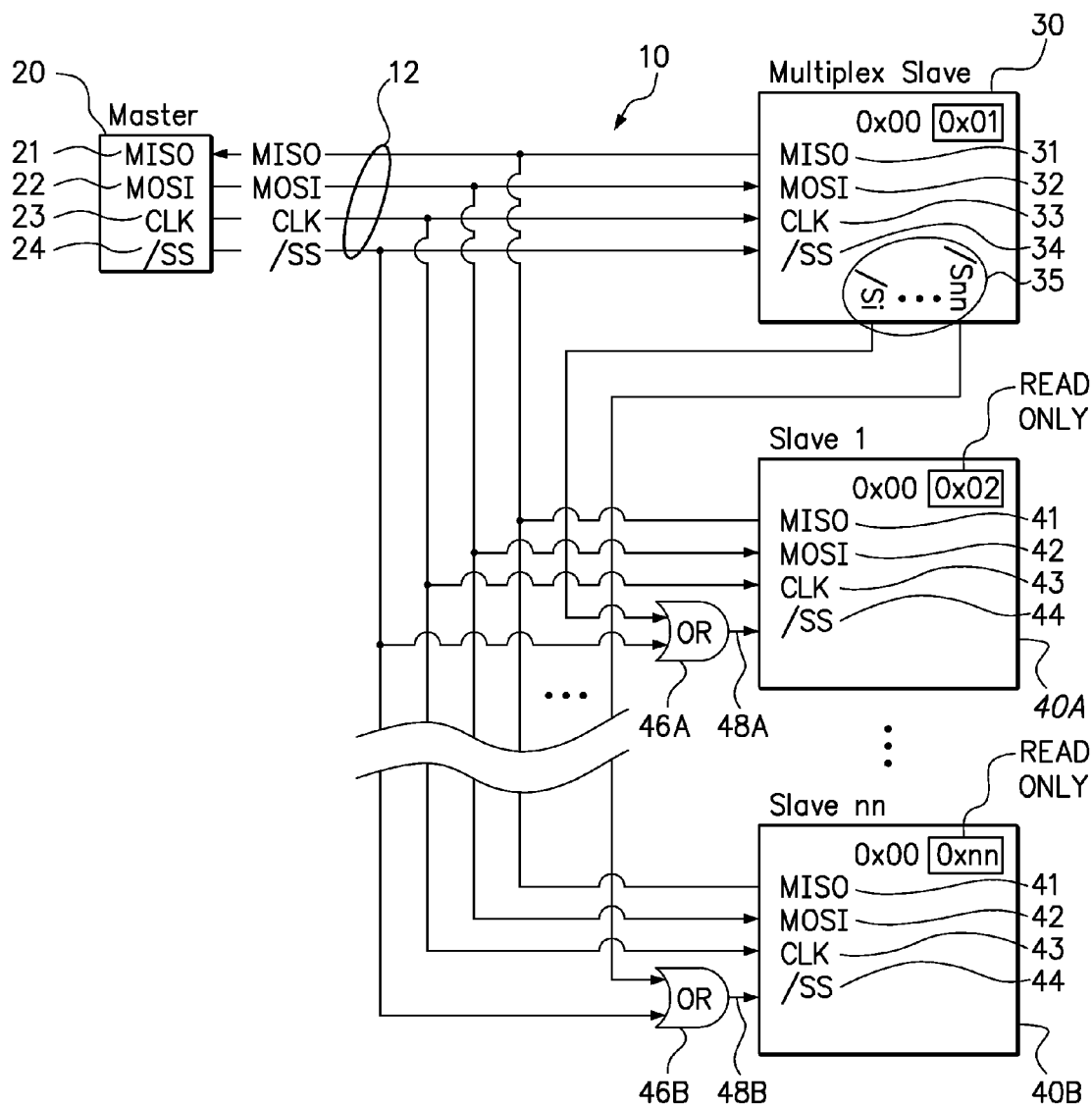
FIG. 4 is a diagram of an SPI bus between a single master device and an addressable multiplex slave device that enables communication between the master device and multiple slave devices without requiring the master device to have a slave select line for each slave device.

FIG. 4 is a diagram of an SPI bus 10 between a single master device 20 and an addressable multiplex slave device 30 that enables communication between the master device and a plurality of non-multiplex slave devices 40A, 40B without requiring the master device 20 to have an SS line for each slave device 30, 40A, 40B. The SPI master device 20 has a MISO pin 21, a MOSI pin 22, a CLK pin 23 and an SS pin 24. Conductive lines 12 are coupled to each of the pins 21, 22, 23, 24 and include parallel branches that extend to the MISO pin 31, MOSI pin 32, CLK pin 33 and SS pin 34 of the multiplex slave 30, respectively, and that extend to the MISO pin 41, MOSI pin 42, CLK pin 43 and SS pin 44 of each non-multiplex slave device 40A, 40B. Each of the multiplex and non-multiplex slave devices 30, 40A, 40B have a fixed memory address, for example 0x00, that is "read-only" and includes a unique identification code for the slave device (i.e., ID 0x01 for multiplex slave device 30, ID 0x02 for the first non-multiplex slave device 40A, and ID 0xnn for the nn$^{th}$ non-multiplex slave device 40B). When the multiplex slave device 30 receives from the master device 20 an instruction to write an ID code, say 0x02, to address 0x00, an SPI controller in the multiplex slave device 30 recognizes that the ID code is not its own code (i.e., not 0x01) and interprets the write instruction as a command to drive the one of the SS lines /S1 to /Snn that is coupled to the SS pin 44 of the slave device 40A that is associated with the ID code 0x02. If the master device 20 sends a subsequent write of ID code 0xnn to address 0x00, the previously selected slave device 40A ignores the command while the multiplex slave device 30 is monitoring the MOSI line and will then drive the SS line /Snn associated with the slave device 0xnn 40B.

The independent SS output pins S1-Snn 35 of the SPI multiplex slave 30 and the SS output pin 24 of the SPI master device 20 are input to an OR circuit 46A, 46B having an output 48A, 48B coupled to a SS input pin 44 of one the plurality of SPI non-multiplex slave devices 0x00-0xnn 40A, 40B. Therefore, a selected SPI non-multiplex slave device will only have duplex communication with the master device 20 if the master device is driving its SS pin 24 and the multiplex slave device 30 is driving the independent SS pin (one of /S1-/Snn) 35 that is coupled to the selected SPI non-multiplex slave device. The SS signals from the master device and from the multiplex slave are typically active low signals, and the OR circuit only produces a low output if both inputs are receiving low signals.

Figure 5:
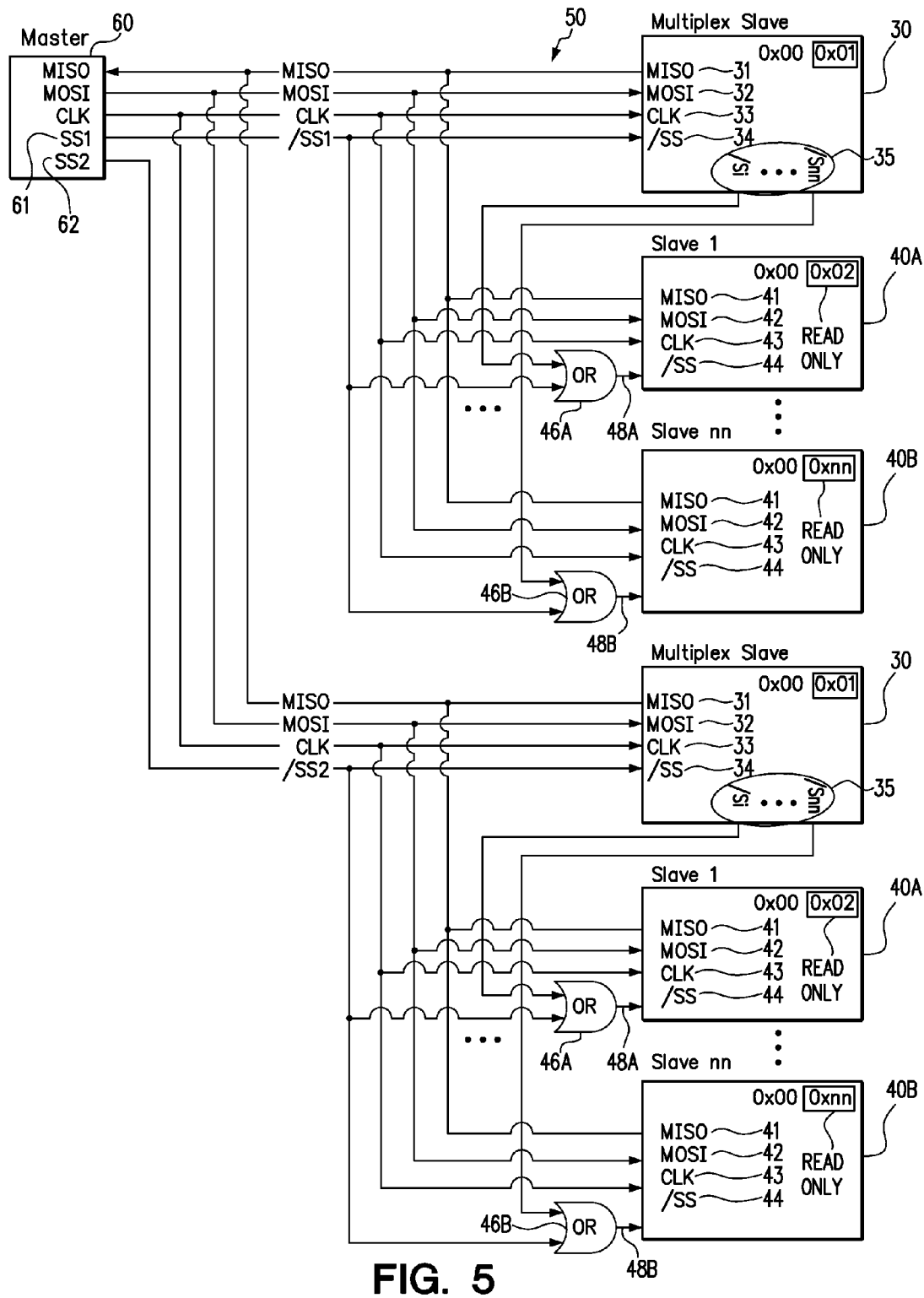
FIG. 5 is a diagram of an SPI bus between a single master device and two addressable multiplex slave devices, each multiplex slave device enabling communication between the master device and multiple slave devices without requiring the master device to have a slave select line for each slave device.

FIG. 5 is a diagram of an SPI bus 50 between a single master device 60 and two addressable multiplex slave devices 30, where each multiplex slave device 30 enables communication between the master device 60 and multiple slave devices 40A, 40B without requiring the master device to have an SS line for each slave device. The SPI master device has first and second SS pins 61, 62 for selecting either a first or a second addressable SPI multiplex slave device. After the master device drives an SS line to a selected one of the multiplex slave devices 30, then the master device may select any of the slave devices that receive an independent SS signal from the selected multiplex slave device. The master device selects a particular slave device by providing the selected multiplex slave 30 with the ID code of the selected slave device.

Specifically, the SPI bus comprises an SPI master device 60 including a master output slave input (MOSI) pin, a master input slave output (MISO) pin, and a clock (CLK) output pin coupled to a first SPI multiplex slave device 30, a first plurality of SPI non-multiplex slave devices associated with the first SPI multiplex slave device 40A, 40B, a second SPI multiplex slave device 30, and a second plurality of SPI non-multiplex slave devices 40A, 40B associated with the second SPI multiplex slave device. The SPI master device 60 further includes a first slave select (SS) output pin 61 coupled to an SS input pin of the first SPI multiplex slave device 30 and a second SS output pin 62 coupled to an SS input pin of the second SPI multiplex slave device 30. The first SPI multiplex slave device includes an independent SS output pin coupled to each one of the first plurality SPI non-multiplex slave devices for sending an activation signal to a selected slave device in response to receiving a signal on the first SS output pin of the master device and a command from the master device containing the address of the selected slave. Similarly, the second SPI multiplex slave device includes an independent SS output pin coupled to each one of the second plurality SPI non-multiplex slave devices for sending an activation signal to a selected slave device in response to receiving a signal on the second SS output pin of the master device and a command from the master device containing the address of the selected slave. Preferably, the master device or a driver to the master device associates each non-multiplex slave device with either the first or the second multiplex slave device so that the master device can drive the appropriate SS line and send the ID code of the selected slave device to the appropriate multiplex slave device.

Figure 6:
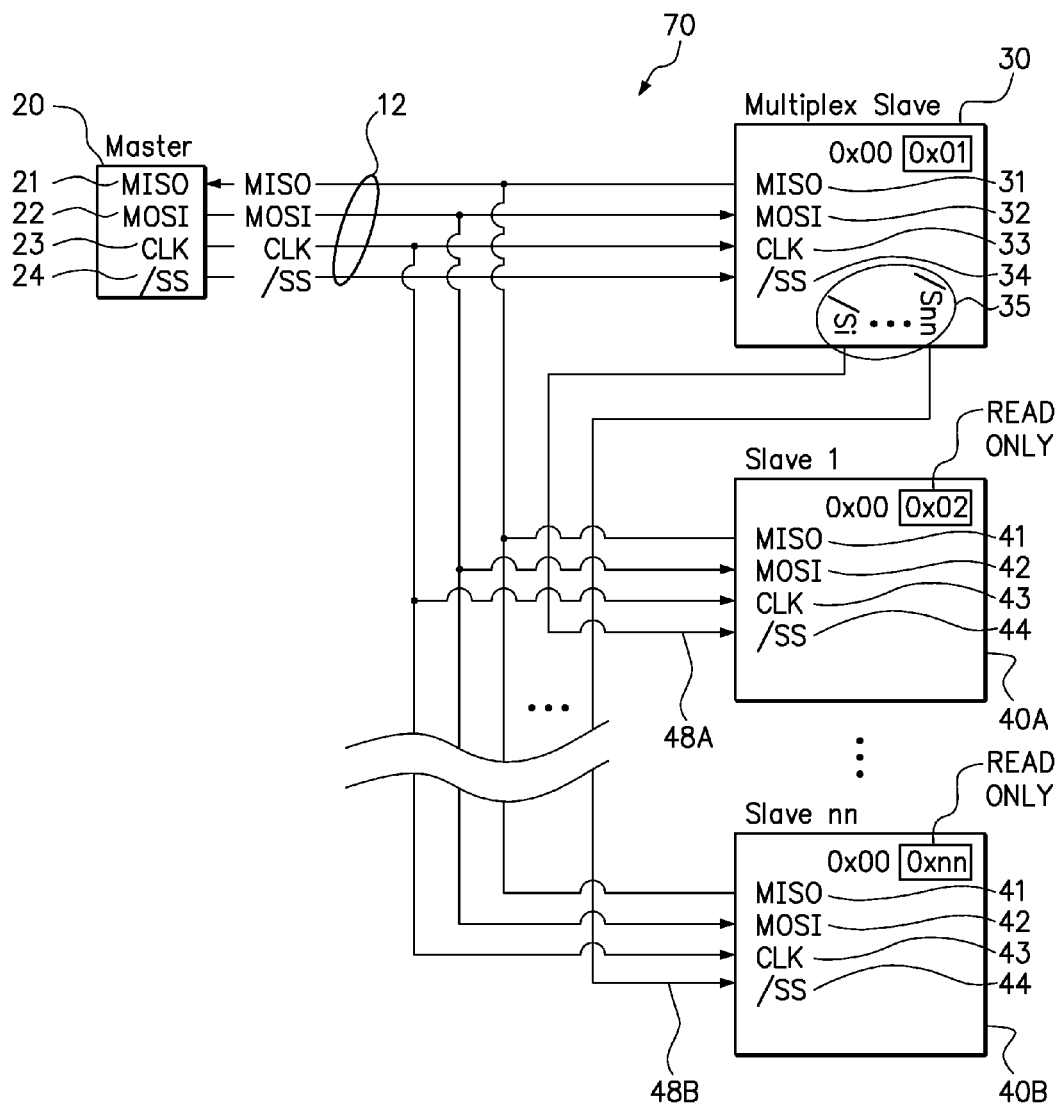
FIG. 6 is a diagram of an alternative embodiment of an SPI bus between a single master device and an addressable multiplex slave device that enables communication between the master device and a plurality of non-multiplex slave devices.

FIG. 6 is a diagram of an alternative embodiment of an SPI bus 70 between a single master device 20 and an addressable multiplex slave device 30 that enables communication between the master device and a plurality of non-multiplex slave devices 40A, 40B. The SPI bus 70 is the same as SPI bus 10 of FIG. 4, except that the SS output from the master device 20 is coupled only to the SS input of the multiplex slave device 30, and the independent SS output pins S1-Snn 35 of the SPI multiplex slave 30 are coupled directly to the SS inputs pins of the associated non-multiplex slave device 40A, 40B without an OR circuit. It should be recognized that the same changes may be implemented into the embodiment of SPI bus 50 in FIG. 5.

The master and slave devices can be any type of device that supports the SPI bus protocol. For example, the multiplex slave may be a micro-controller and the slave devices may be an application specific integrated circuits (ASIC). In a further example, an ASIC may implement an SPI optical mouse or SPI flash memory.

The term "OR circuit" refers to any circuit that produces a low output only in response to receiving two inputs that are both low. For example, an OR circuit will require two low input signals as a condition for producing a low output signal. Accordingly, if a first input signal is high OR a second input signal is high, then the output signal will be high. An OR circuit may be an OR logic gate, but other circuits may accomplish the same function.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A serial peripheral interface bus, comprising:
a serial peripheral interface master device having a master output slave input pin, a master input slave output pin, a clock output pin, and a slave select output pin, each of the master device pins being coupled in parallel to a serial peripheral interface multiplex slave device and a plurality of serial peripheral interface non-multiplex slave devices, wherein the multiplex slave device includes an independent slave select output pin coupled to each one of the non-multiplex slave devices for sending an activation signal to a selected slave device in response to receiving a command from the master device containing the address of the selected slave; and wherein one of the independent slave select output pins of the multiplex slave and the slave select output pin of the master device are input to an OR circuit having an output coupled to a slave select input pin of one the plurality of non-multiplex slave devices.

2. The serial peripheral interface bus of claim 1, wherein each non-multiplex slave device has a unique address stored at a fixed address common to each of the non-multiplex slave devices.

3. A serial peripheral interface bus, comprising:
a serial peripheral interface master device including:
 (a) a master output slave input pin;
 (b) a master input slave output pin;
 (c) a clock output pin; and
 (d) a slave select output pin;
a serial peripheral interface multiplex slave device and a plurality of serial peripheral interface non-multiplex slave devices, each of the multiplex and non-multiplex slave devices including:
 (a) a master output slave input pin coupled to the master output slave input pin of the master device;
 (b) a master input slave output pin coupled to the master input slave output pin of the master device;
 (c) a clock input pin coupled to the clock output pin of the master device; and
 (d) a slave select input pin;

wherein the slave select output pin of the master device is coupled to the slave select input pin of the multiplex slave device; and wherein the multiplex slave device includes a plurality of slave select output pins, each slave select output pin of the multiplex slave device being coupled to the slave select input pin associated with one of the non-multiplex slave devices; and a plurality of OR circuits, wherein each slave select output pin of the multiplex slave device is coupled to the slave select input pin associated with one of the non-multiplex slave devices through one of the OR circuits, wherein each OR circuit has a first input coupled to the slave select output pin of the master device, a second input coupled to one of the slave select output pins of the multiplex slave device, and an output coupled to the slave select input pin of the associated one of the plurality of non-multiplex slaves.

4. The serial peripheral interface bus of claim 3, wherein a unique identification code is stored by each of the multiplex and non-multiplex device in a common address.

5. The serial peripheral interface bus of claim 3, wherein a unique identification code is stored by each of the multiplex and non-multiplex device in a common address.

6. The serial peripheral interface bus of claim 4, wherein the unique identification code is stored as read-only data.

7. The serial peripheral interface bus of claim 5, wherein the unique identification code is stored as read-only data.

8. A method of communicating between a master device and a plurality of slave devices on a serial peripheral interface bus, comprising:
initializing the serial peripheral interface bus to route data output from the master device to an addressable multiplex slave device;
the master device sending a slave identification code to the multiplex slave device by writing the slave identification code to a fixed memory address in the multiplex slave device;
the multiplex slave device providing a slave select signal only to a slave device associated with the slave identification code received from the master device;
the selected slave device activating an output pin to the master in response to receiving the slave select signal from the multiplex slave; and
sending data between the master device and the selected slave device.

9. The method of claim 8, further comprising:
the multiplex slave device configuring its master input slave output pin as an input in response to the master device sending a slave identification code that is not the identification code of the multiplex slave.

10. The method of claim 8, further comprising:
the multiplex slave device monitoring the master output slave input pin for a write command form the master device directed to the fixed memory address to identify a subsequently selected slave identification code; and
the multiplex slave device providing a slave select signal only to the subsequently selected slave device in response to receiving the subsequently selected slave identification code from the master device;
the subsequently selected slave device activating an output pin to the master in response to receiving the slave select signal from the multiplex slave; and
sending data between the master device and the subsequently selected slave device.

11. A serial peripheral interface bus, comprising:

a serial peripheral interface master device including a master output slave input pin, a master input slave output pin, and a clock output pin coupled to a first serial peripheral interface multiplex slave device, a first plurality of serial peripheral interface non-multiplex slave devices associated with the first multiplex slave device, a second serial peripheral interface multiplex slave device, and a second plurality of serial peripheral interface non-multiplex slave devices associated with the second multiplex slave device, wherein the master device further includes a first slave select output pin coupled to a slave select input pin of the first multiplex slave device and a second slave select output pin coupled to a slave select input pin of the second SPI multiplex slave device;

wherein the first multiplex slave device includes an independent slave select output pin coupled to each one of the first plurality of non-multiplex slave devices for sending an activation signal to a selected slave device in response to receiving a signal on the first slave select output pin of the master device and a command from the master device containing an identification code for the selected slave, and wherein one of the independent slave select output pins of the first multiplex slave device and the slave select output pin of the master device are input to an OR circuit having an output coupled to a slave select input pin of one the first plurality of non-multiplex slave devices; and wherein the second multiplex slave device includes an independent slave select output pin coupled to each one of the second plurality of non-multiplex slave devices for sending an activation signal to a selected slave device in response to receiving a signal on the second slave select output pin of the master device and a command from the master device containing an identification code for the selected slave, and wherein one of the independent slave select output pins of the second multiplex slave device and the slave select output pin of the master device are input to an OR circuit having an output coupled to a slave select input pin of one the second plurality of non-multiplex slave devices.

* * * * *